(12) United States Patent
Doll et al.

(10) Patent No.: US 9,723,504 B2
(45) Date of Patent: Aug. 1, 2017

(54) MEASUREMENT IN RADIO COMMUNICATION SYSTEMS

(75) Inventors: Mark Doll, Stuttgart (DE); Hardy Halbauer, Ettlingen (DE); Bozo Cesar, Stuttgart (DE); Yejian Chen, Stuttgart (DE); Robert Fetscher, Stuttgart (DE); Bernd Gloss, Stuttgart (DE); Oliver Stanze, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 564 days.

(21) Appl. No.: 13/061,140

(22) PCT Filed: Jul. 10, 2009

(86) PCT No.: PCT/EP2009/058844
§ 371 (c)(1),
(2), (4) Date: May 13, 2011

(87) PCT Pub. No.: WO2010/023023
PCT Pub. Date: Mar. 4, 2010

(65) Prior Publication Data
US 2011/0205923 A1    Aug. 25, 2011

(30) Foreign Application Priority Data
Aug. 28, 2008   (EP) .................................... 08290806

(51) Int. Cl.
*H04L 12/26* (2006.01)
*H04W 24/10* (2009.01)
(Continued)

(52) U.S. Cl.
CPC ............ *H04W 24/10* (2013.01); *H04B 17/24* (2015.01); *H04B 17/26* (2015.01); *H04B 17/309* (2015.01); *H04B 17/382* (2015.01); *H04W 24/06* (2013.01)

(58) Field of Classification Search
CPC . H04L 25/0226; H04L 5/0007; H04L 1/0026; H04L 1/20; H04L 27/2607;
(Continued)

(56) References Cited

U.S. PATENT DOCUMENTS

| 6,510,174 B1 * | 1/2003 | Sexton ................. H04W 28/18 370/252 |
| 7,388,847 B2 * | 6/2008 | Dubuc et al. ................. 370/329 |

(Continued)

FOREIGN PATENT DOCUMENTS

| EP | 1 808 985 A | 7/2007 |
| EP | 1808986 A | 7/2007 |

(Continued)

OTHER PUBLICATIONS

International Search Report for PCT/EP2009/058844 dated Oct. 6, 2009.

(Continued)

*Primary Examiner* — Shaq Taha
*Assistant Examiner* — Lionel Preval
(74) *Attorney, Agent, or Firm* — Fay Sharpe, LLP

(57) ABSTRACT

A sounding method in a cellular wireless communication system, comprising at least one mobile station and at least two base stations. One base station is a serving base station for the mobile station and the at least one further base station is a neighboring base station. The serving base station generates a schedule for measurement signals and transmits said schedule to the mobile station and to the neighboring base station. The mobile station transmits measurement signals in accordance with the schedule to the serving base station and to the neighboring base station. Furthermore, the neighboring base station calculates a mean channel state for the uplink channel from the mobile station to itself and transmits the mean channel state to at least one further base (Continued)

station, so that said base station can be provided with channel estimations for uplink channels between the mobile station and all base stations.

15 Claims, 6 Drawing Sheets

(51) Int. Cl.
    *H04B 17/24*     (2015.01)
    *H04B 17/26*     (2015.01)
    *H04B 17/309*     (2015.01)
    *H04B 17/382*     (2015.01)
    *H04W 24/06*     (2009.01)

(58) Field of Classification Search
    CPC ..... H04L 5/003; H04L 5/0053; H04L 1/0015; H04L 1/0029; H04L 27/2601; H04L 5/023; H04B 7/0671; H04W 72/085; H04W 72/1231; H04W 72/1278; H04W 24/10; H04W 28/01
    USPC ........ 370/252, 317, 329, 330, 310; 455/501, 455/522, 423
    IPC ..................... H04W 24/10,24/06; H04B 17/24, H04B 17/26, 17/308, 17/382
    See application file for complete search history.

(56) References Cited

U.S. PATENT DOCUMENTS

| | | | |
|---|---|---|---|
| 2004/0057394 A1* | 3/2004 | Holtzman | 370/317 |
| 2008/0108377 A1* | 5/2008 | Yoon | 455/501 |
| 2008/0188260 A1* | 8/2008 | Xiao et al. | 455/522 |
| 2009/0225720 A1* | 9/2009 | Molisch et al. | 370/330 |
| 2010/0075693 A1 | 3/2010 | Kishigami et al. | |
| 2010/0311450 A1* | 12/2010 | Rinne et al. | 455/501 |
| 2011/0014909 A1* | 1/2011 | Han | H04J 11/0093 455/423 |
| 2011/0096707 A1* | 4/2011 | McCoy | H04W 24/10 370/310 |

FOREIGN PATENT DOCUMENTS

| | | |
|---|---|---|
| JP | 2008-193666 A | 8/2008 |
| WO | WO 2008/033369 A | 3/2008 |
| WO | WO 2008/033369 A2 | 3/2008 |
| WO | WO 2008/033369 A3 | 3/2008 |

OTHER PUBLICATIONS

Japanese Office Action—Examiner's Office Letter and translation; dated May 29, 2012; dispatched Jun. 4, 2012; 7 pgs.
IEEE Std 802.16™—2005 and IEEE Std 802.16™—2004/Cor1-2005 (Amendment and Corrigendum to IEEE Std. 802.16-2004).

* cited by examiner

| 1 | RADIO COMMUNICATION STATION |
|---|---|
| 2 | MOBILE STATION |
| 3 | SERVING BASE STATION |
| 4 | NEIGHBORING BASE STATION |

| 1 | RADIO COMMUNICATION SYSTEM |
| 2 | FIRST MOBILE STATION |
| 3 | FIRST BASE STATION |
| 4 | SECOND BASE STATION |
| 5 | RESPECTIVE SECTORS |
| 6 | SECOND MOBILE STATION |

| S1 | GENERATE UPLINK SOUNDING SIGNAL SCHEDULE |
| S2 | TRANSMIT SCHEDULE |
| S3 | TRANSMIT UPLINK SOUNDING SIGNALS |
| S4 | CALCULATE AND TRANSMIT MEAN CHANNEL STATE |

MEASUREMENT IN RADIO COMMUNICATION SYSTEMS

This is a National Stage filing of PCT/EP2009/058844, which is based on a priority application EP 08 290 806.2, which is hereby incorporated by reference.

TECHNICAL FIELD

The present invention relates to measurement in radio communication systems. In particular, the present invention relates to a sounding method in a cellular wireless communication system, the communication system itself and its components like base stations and mobile stations.

BACKGROUND OF THE INVENTION

Cellular wireless data access systems typically consist of a set of base stations each with a certain number of sectors and each sector having a transmitter and a receiver with one or multiple antenna elements. Mobile stations are typically assigned to one or more base stations by wireless connections to one sector of each of these base stations. Base stations and sectors are related to geographical areas where the distance to the antennas belonging to the sectors is low, the angular range supported by the antenna corresponds to that area and the channel quality between users located in that area and the base station including interference from other mobile stations/base station is sufficient to establish a wireless connection.

However, connections between a base station and mobile stations that are assigned to the same sector of that base station can typically have significantly different channel qualities and very different path losses depending on their distance to the base station, which typically varies from a few meters up to a few kilometers. For example, WiMAX (IEEE 802.16) uses OFDM/OFDMA and each single radio resource (frequency sub-band or time slot) is used in one point-to-point transmission. Multiplexing and multiple access is done using different, at least approximately orthogonal radio resources. However, in addition to the above problems a strong interference may occur to base stations and mobile stations in systems like WiMAX, if mobile stations are located at sector borders or cell borders, especially if such systems operate in multi-cellular deployments with frequency reuse 1.

U.S. Pat. No. 6,510,174 B1 describes a method and apparatus for facilitating setting of link parameters to improve communication qualities between a mobile station and a base station in a radio communication system. Uplink sounding bursts are generated by a mobile station and transmitted to the network infrastructure. The uplink sounding bursts are analyzed to determine channel conditions upon which the uplink sounding bursts are transmitted. Link parameters are selected based on said analysis.

It is therefore an object of the present invention to provide a measurement basis for advanced interference mitigation schemes.

This object and other objects are solved by the features of the independent claims. Preferred embodiments of the invention are described by the features of the dependent claims.

SUMMARY OF THE INVENTION

A measurement method for advanced interference mitigation schemes in a radio communication system is provided, which generates a schedule for measurement signals in a serving base station, transmits said schedule from the serving base station to a mobile station, transmits measurement signals from the mobile station to the serving base station in accordance with said schedule, and calculates the channel state for the uplink channel from the mobile station to the serving base station According to the present invention the schedule is also transmitted from the serving base station to at least one neighboring base station, the measurement signals are also transmitted from the mobile station to the at least one neighboring base station, a mean channel state for the mobile station is calculated in the at least one neighboring base station, and the mean channel state is transmitted from the at least one neighboring base station to at least one further base station of the radio communication system.

To enable inter-sector channel estimation, as proposed by the present invention, the serving base station coordinates its measurement with the at least one neighboring base station within a certain range or area. This means that all base stations within that range schedule measurement for their mobile stations during the same time/same OFDM symbols and make sure not to schedule any other transmissions during that time. Furthermore, all these measurement allocations must not overlap. For example, each subcarrier is assigned to at most one mobile station at the same time within a certain area surrounding each mobile station. Both prerequisites can be fulfilled either by static configuration or by dynamically adapting sounding subcarrier allocation to the current mobile station density, distribution and mobility.

The range is given in units of sectors, e.g. a range of 1 means coordination with all neighboring sectors (first ring), a range of 2 means a coordination also with neighbors of neighboring sectors (second ring), and so on. The range is typically constant for all base stations but configurable, e.g. to the needs of the deployed advanced interference mitigation scheme for which coordinated sounding provides the required inter-sector channel estimations. That is, the range defines a quasi circular area around a base station, or more precisely around a sector, with the range as its radius. Thus, every base station has it own area with itself at the center, with areas of nearby base stations partly overlapping.

The at least one neighboring base station transmits the calculated mean channel state between itself and the mobile station at least to the serving base station. Preferably, serving base station and neighboring base station transmit their respective calculated mean channel state to all further base stations that have both, said serving base station and said neighboring base station, falling into their respective area, thereby providing every base station with channel estimations for all mobile station—base station channels within the area surrounding itself. Thus, coordinated sounding according to the present invention can provide the base station at the center of an area with channel estimations of all base station—mobile station channels within its area that means of all channels between all base stations and mobile stations that fall within its area. A special case would be a range of infinity, in which case coordinated sounding provides every base station with channel estimation of all base station—mobile station channels within the cellular network. A range of zero would result in standard uplink sounding as currently specified for IEEE 802.16/WiMAX.

To enable all base stations within the determined area to calculate channel estimations based on the received sounding signals, separately for each mobile station, every base station distributes to all other base stations within said area subcarrier allocations of its mobile stations and the transmit power that each of its mobile stations uses for its sounding allocation. This information exchange is typically carried over the backhaul link.

To predict interference for transmissions taking place on arbitrary subcarriers some time in the future, a mean channel state is estimated, which is frequency independent and only changes relatively slowly over time, thus averaging out (frequency selective) fast fading only leaving (relatively frequency independent) slow fading and shadowing/movement related changes of the channel under estimation. For this purpose coordinated sounding is repeated regularly, typically periodically, and a mean channel state per mobile station is calculated by averaging over multiple measurements in frequency and time. Averaging can be carried out by e.g. calculating an arithmetic mean over all subcarriers of a mobile station within one sounding occurrence and smoothing these over multiple recurrences e.g. using an exponentially weighted moving average.

Assuming channel reciprocity, the estimation is usable for both uplink and downlink interference prediction. Channel reciprocity holds for TDD systems. With regard to the broad averaging applied and the typically small spacing of the uplink and downlink frequency bands, the estimation might be sufficient for the downlink in FDD systems, too.

Now every base station has an estimation of the channels from all mobile stations within said determined range to itself as base station. To furthermore allow every base station to know every base station—mobile station channel within said range and not only those with itself as base station, every base station distributes its estimated per mobile station channel state to all other base stations within said range, again typically via the backhaul link. A typical channel state can be the average path loss plus angle under which the sounding signal was received by the base station. A more elaborated channel state specifies the averaged per base station antenna—mobile station antenna pair (SISO) channel impulse response.

Thus, all base stations are now able to predict the mutual interference of transmissions within their own sector and transmissions within other sectors within said range. The coordinated sounding according to the present invention thereby provides the measurement basis for advanced interference mitigation schemes. According to a preferred embodiment of the present invention the measurement signals can be sounding signals or a data burst. In case that the measurement signal is a sounding signal, the schedule for the measurement signals generated in the serving base station includes the transmit power of the mobile station. In case that the measurement signal is a data burst the schedule includes also information about what is transmitted. This is not necessary in the case of sounding signals, since in such case said information is predefined. That is, instead of using well-known sounding signals, it is also possible to carry out inter-sector channel measurements on transmitted data bursts.

Regarding the signaling load (on the backhaul) induced by coordinated sounding according to the present invention, some of the transmitting and receiving steps, for example, the distribution of the subcarrier allocations, the transmit power, and the estimated per mobile station channel state from each base station to all other base stations within the specific range, can be limited to take place only once or when the exchanged information has changed by more than a certain threshold. This will help reducing the signaling load, but requires information to be cached by all receiving base stations within said range. The subcarrier allocation used for sounding is typically constant in time as long as a mobile station stays within a sector and is therefore exchanged only once, when a mobile station handovers to another base station. The transmit power is the same for all subcarriers of a sounding allocation and typically changes continuously in relatively small steps as the mobile station changes its transmit power for other uplink transmissions. The same holds for the calculated estimation of the channel state, which by design changes continuously. Consequently, signaling load only increases with increasing mobile station mobility and is dominated by the distribution of the transmit power and the estimated per mobile station channel state from each base station to all other base stations within said range.

Information of subcarrier allocations used for sounding should be distributed using a reliable signaling transport, as it changes seldom and is accordingly transmitted quite infrequently. In contrast, sporadically losing information of transmit power and estimated per mobile station channel state only results in a relatively small deviation in the channel estimation for a relatively short time, as said information changes quite often and in a continuous fashion with small steps. Therefore, said information (transmit power and estimated per mobile station channel state) may be distributed in a resource efficient way using an unreliable transport, e.g. by multicasting, provided that small inconsistencies in the channel estimations among base stations is acceptable for the deployed advanced interference mitigation scheme.

To sum up, according to the present invention channel states are estimated not only between a mobile station and its serving base station but also between the mobile station and its neighboring base stations. Measurement signals generated by mobile stations with well-defined modulation of its allocated subcarriers and with a well-defined transmit power are received by the serving base station and a number of neighboring base stations, wherein the number of neighboring base stations depends on the configured range. Neighboring base stations receive a schedule for the measurement signals of a mobile station from the serving base station. The neighboring base stations estimate channel states for the mobile station and transmit said states at least to the serving base station of the mobile station, preferably to all base stations that have both the serving base station and the neighboring base station falling within their respective area surrounding them. In the preferred case, also the serving base station transmits its channel estimation to all said base stations. This provides at least the serving base station, preferably all said base stations, with channel estimations for said mobile station.

Thus, the present invention describes a measurement scheme for measuring the uplink channel between arbitrary pairs of base stations and mobile stations, wherein the term uplink refers to the direction from a mobile station to a base station. In particular, inter-cell or inter-sector interference is reduced by coordinating the transmissions in sectors that are close to each other, since according to the present invention only transmissions to/from mobile stations that result in a low mutual interference are scheduled on the same time and frequency resource. To determine a suitable scheduling, said mutual interference is predicted by knowledge of the channel between the mobile station and its serving base station and the channel between said base station and a mobile station in a sector served by another base station near by. A base station is referred to a serving base station with respect to all mobile stations that belong to one of the sectors of said base station.

In particular, the present invention allows for interference mitigation between neighboring sectors of a cellular wireless communication system, since the coordinated sounding gathers channel estimations separately for each pair of base station and mobile station, thereby enabling advanced interference mitigation schemes, which e.g. schedule only those pairs on the same time and frequency resource that show a small mutual interference. Furthermore, data throughput for mobile stations located at sector borders is increased, wherein the additional signaling load (e.g. on backhaul) between neighboring base stations is relatively low.

These and other aspects of the present invention will be apparent from and elucidated with reference to the embodiments thereafter. It should be noted that the use of reference signs shall not be construed as limiting the scope of the invention.

DETAILED DESCRIPTION

Figure 1:
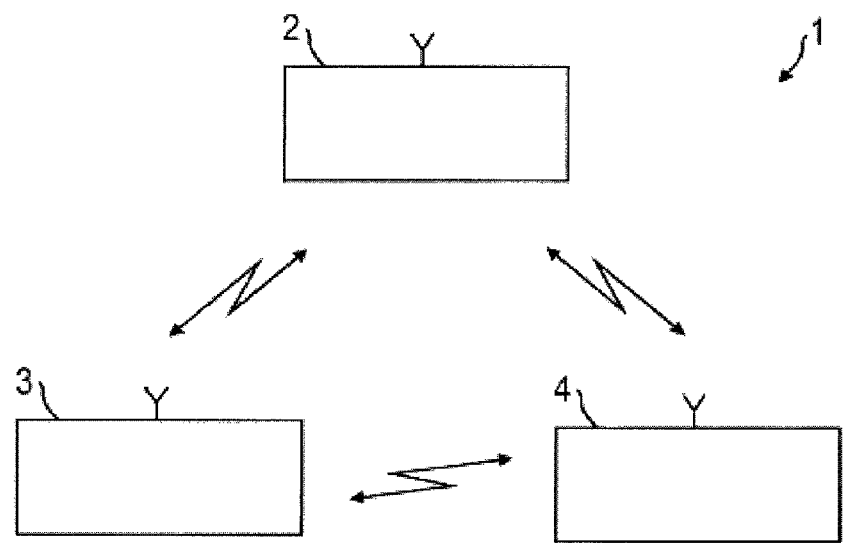
FIG. 1 shows an exemplary radio communication system, comprising one mobile station and two base stations.

FIG. 1 shows an exemplary radio communication system 1, comprising one mobile station 2 and two base stations. One of said base stations is a serving base station 3 for the mobile station 2 and the at least one further base station is a neighboring base station 4 of the serving base station 3. According to an embodiment of the present invention the serving base station 3 is adapted to generate a schedule for uplink sounding signals and to transmit said schedule to the mobile station 2 and to the neighboring base station 4. The mobile station 2 is adapted to transmit uplink sounding signals in accordance with said schedule to the serving base station 3 and to the neighboring base station 4. Furthermore, the neighboring base station 4 is adapted to calculate a mean channel state for the mobile station 2 and to transmit said mean channel state to at least one further base station of the radio communication system 1.

Figure 2:
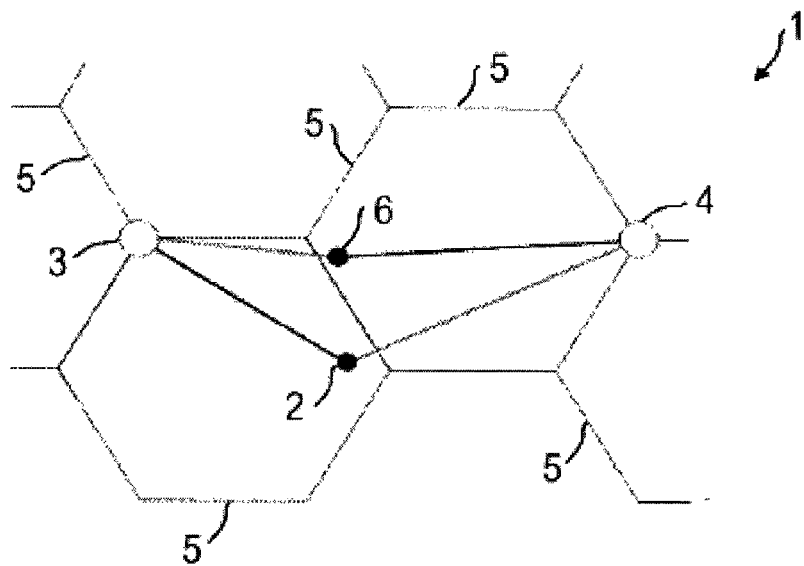
FIG. 2 shows the radio communication system of FIG. 1 in more detail.

FIG. 2 shows the radio communication system 1 of FIG. 1 in more detail. As can be seen from FIG. 2 each of the base stations 3, 4 has a certain number of sectors 5, wherein a first mobile station 2 is located in a sector served by a first base station 3 and a second mobile station 6 is located in a sector served by a second base station 4. That is, the first mobile station 2 is associated with the first base station 3 and the second mobile station 6 is associated with the second base station 4, wherein the respective sectors 5 abut against each other. The standard uplink sounding as specified in the IEEE 802.16/WiMAX standard allows the first base station 3 to estimate a first uplink channel between the first mobile station 2 and the first base station 3 and allows the second base station 4 to estimate a second uplink channel between the second mobile station 6 and the second base station 4. However, there is no mechanism specified by IEEE 802.16e to estimate the path loss in uplink direction between a mobile station and a base station not serving it. From downlink transmission mobile stations can measure and report the RSSI (Received Signal Strength Indicator) of other base stations via the MOB_SCN-REP message, but, for example, not the angle under which a signal from a base station is received.

The uplink sounding specified in IEEE 802.16e utilizes one or more full OFDM (Orthogonal Frequency Division Multiplex) symbols within the uplink subframe exclusively for the purpose of sounding. The base station allocates to each of its mobile stations, for which it wants to estimate the radio channel, a certain number of subcarriers in these sounding symbols. Each mobile station modulates its allocated subcarriers in a well-defined manner and with a well-defined transmit power. The base station then estimates the channel for these subcarriers based on the received signal. In contrast, coordinated sounding according to the present invention additionally allows estimating inter-sector uplink channels between the second mobile station 6 and the first base station 3 and between the first mobile station 2 and the second base station 4, respectively.

Figure 3:
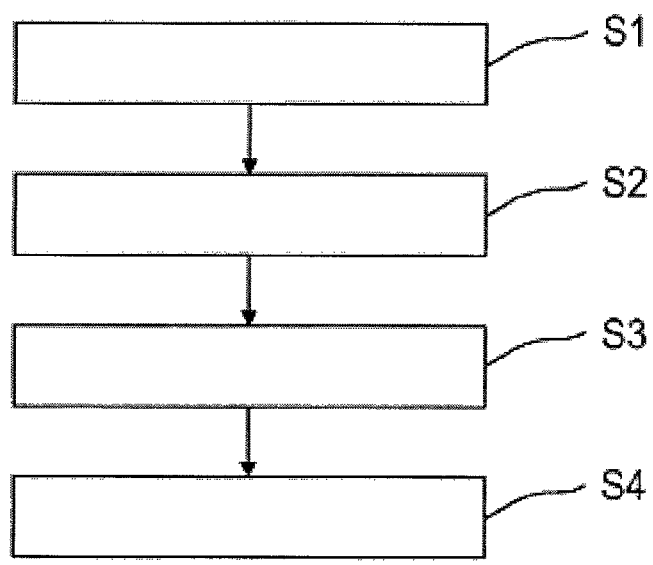
FIG. 3 shows a flow chart of a measurement method according to the present invention.

FIG. 3 shows a flow chart of a measurement method according to the present invention. Such method can be applied to a radio communication system comprising at least one mobile station and at least two base stations, each having a certain number of sectors, as for example shown in FIGS. 1 and 2. One of said base stations is a serving base station for the mobile station and the at least one further base station is a neighboring base station of said serving base station. In a first step S1 the serving base station generates a schedule for uplink sounding signals. In a second step S2 said schedule is transmitted from the serving base station to the mobile station and to the at least one neighboring base station. In a third step S3 uplink sounding signals are transmitted from the mobile station to the serving base station and to the at least one neighboring base station, that is both transmissions occur simultaneously. In a fourth step S4 the at least one neighboring base station calculates a mean channel state for the mobile station and transmits said mean channel state to the serving base station.

Figure 4A:
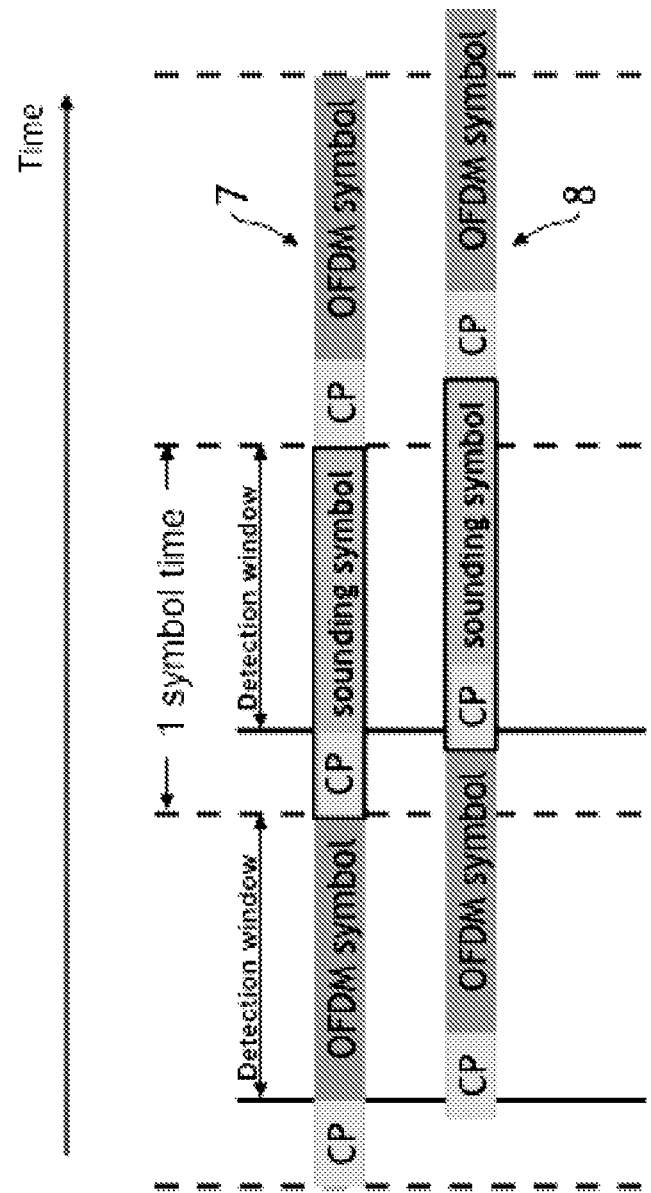
FIG. 4a shows a first timing variant in a radio communication system based on the IEEE 802.16e standard.
Figure 4B:
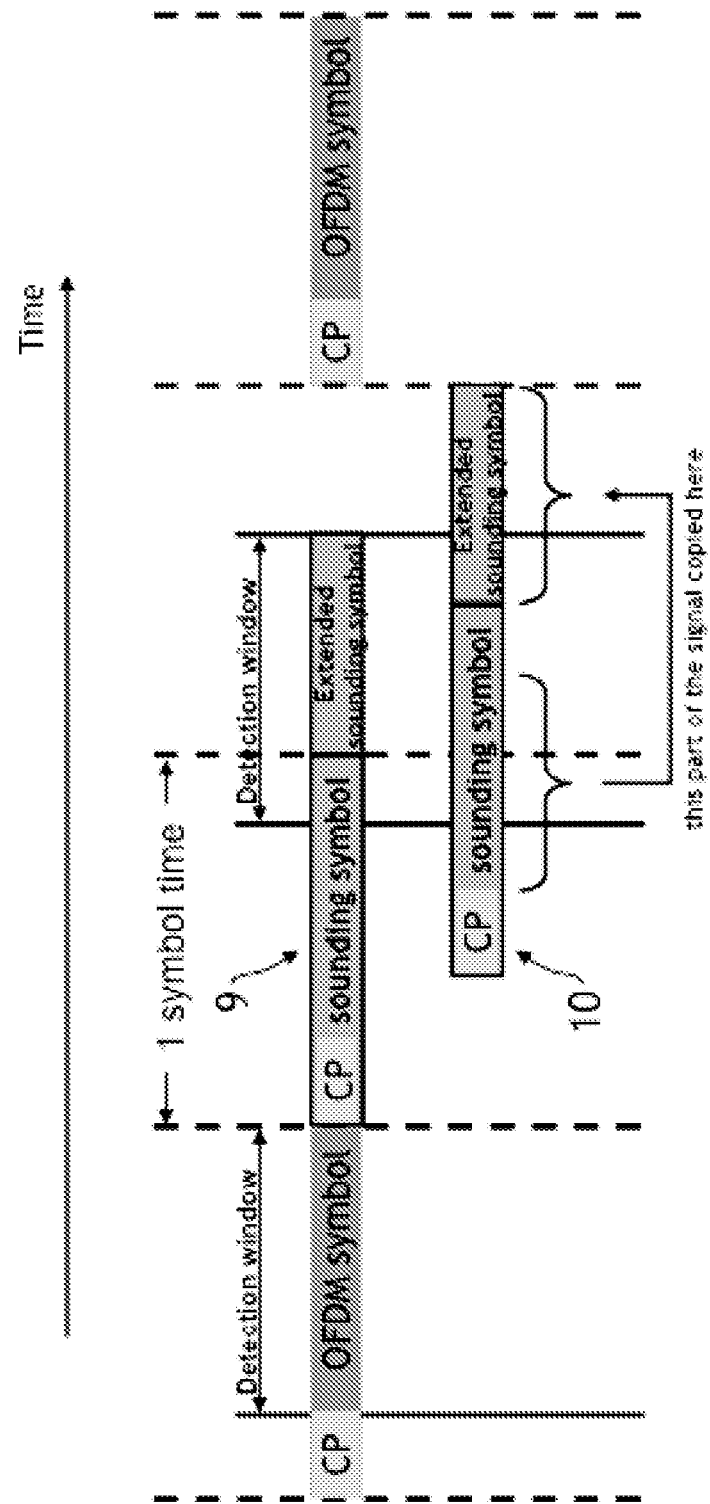
FIG. 4b shows a second timing variant in a radio communication system based on the IEEE 802.16e standard.
Figure 4C:
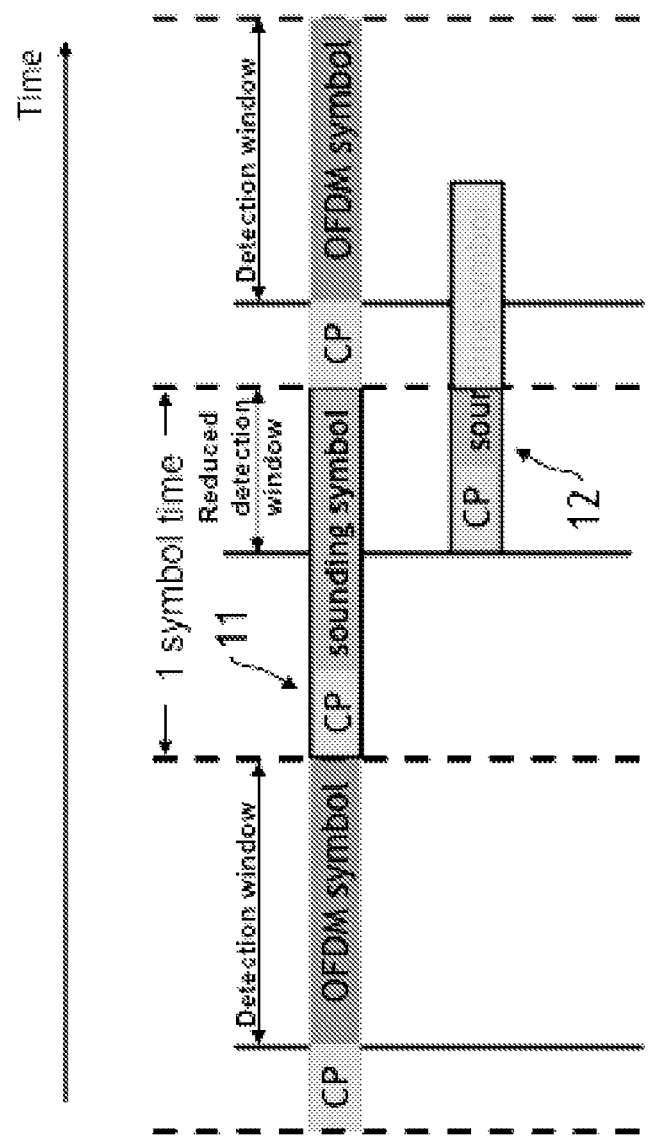
FIG. 4c shows a third timing variant in a radio communication system based on the IEEE 802.16e standard.

FIGS. 4a, 4b, and 4c show first, second, and third timing variants, respectively, in a communication system based on the IEEE 802.16e (WiMAX, Worldwide Interoperability for Microwave Access) standard. In IEEE 802.16e mobile stations synchronize their OFDMA transmissions to their sewing base station in way as if all mobile stations were co-located with their base station. This requires mobile stations farther away from the base station to transmit earlier. In coordinated sounding according to the present invention, such synchronization is impossible, since the transmitted sounding signal is destined for multiple base stations at different distances. Consequently, coordinated sounding transmission will arrive too late at all base stations except the base station that the mobile station is associated with.

In the following, three timing variants are proposed to cope with this desynchronization in coordinated sounding. The respective timing variants can be used so that more distant neighboring base stations are able to receive the uplink sounding signals with an appropriate timing window without being disturbed by regular communication of the neighboring base stations.

OFDM signals, as shown in FIGS. 4a, 4b, and 4c incorporate a cyclic prefix (CP) to cope with multipath propagation and slight desynchronization. FIG. 4a shows a first signal 7 representing an optimum timing adjustment of a mobile station to its serving base station, so that the sounding symbol is exactly within the detection window. According to the timing variant shown in FIG. 4a the CP size corresponds to a propagation delay equivalent to a distance of a few kilometers (typically about 3 km). This allows coordinated sounding to be carried out with a range set to one inter-base station distance and with only those mobile stations near the (far away) sector borders participating. That is, only a mobile station with a distance to its serving and to its neighboring base stations not differing by more than what can be absorbed by the CP are participating in coordinated sounding according to the first timing variant. Normally, only a part of the CP equivalent distance can be taken into account here, depending on how much of the CP is needed to absorb inter-symbol interference caused by delay spread from the OFDM symbol directly preceding the sounding symbol. In the case shown by the second signal 8 in FIG. 4*a* a decoding within the detection window is still feasible, since corresponding CP and symbol part are within the detection window. This first timing variant shown in FIG. 4*a* is transparent to the IEEE 802.16e/WiMAX air interface and a standard compliant operation.

The second timing variant according to the present invention is shown in FIG. 4*b*. In FIG. 4*b*, a first signal 9 represents the signal at the serving base station and a second signal 10 represents the signal at one neighboring base station. According to the second timing variant the sounding symbol of the second signal 10 is extended by the requirements of a propagation delay to the farthest neighboring base stations inside the coordination range, since the delay of the second signal 10 is larger than the CP (e.g. a signal from a mobile station belonging to a more distant base station). The cyclic extension of the symbol has the effect of an increased CP. Furthermore, the length of the extension can be adapted to the expected delay of the signal. Therefore, the time a mobile station transmits the sounding signal is increased while the time a base station samples the received signal is kept constant. Since sounding transmissions never arrive too early but always too late, the detection takes place at the end of the transmission time, e.g. the detection window is delayed by an offset equal to the time the transmission of the sounding signal was extended. In principle, an arbitrary (in steps of the sampling period) increase is possible. A mobile station simply cyclically repeats its generated OFDM symbol, excluding the prepended CP, with the last repetition being repeating only the first part of the symbol. The cyclic repetition prevents a phase jump within the transmission and retains orthogonality of the signals from different mobile stations received by the base stations, irrespective where a base station starts its (one useful symbol time long) detection window. Each increase by one useful symbol time corresponds to an increase of about 30 km in the possible coordinated sounding range, assuming a typical symbol time. However, due to symbol border overlap the signal occupies a multiple of one symbol time, leading to an increase of the overhead by the same factor. The second timing variant is not possible with current IEEE 802.16e/WiMAX conforming mobile stations, as arbitrary prolongation by cyclic repetition of a signal is non-standard.

The third timing variant according to the present invention is shown in FIG. 4*c*. In FIG. 4*c*, a first signal 11 represents the signal at the serving base station and a second signal 12 represents the signal at one neighboring base station. According to the third timing variant the time a mobile station transmits its sounding signal is kept constant (1 symbol time) while the time a base station samples the received signal is decreased to a certain fraction of the regular detection window (one useful symbol time). Similar to the second timing variant, shown in FIG. 4*b*, detection by the base station takes place at the end of the transmission time at the end of the sounding symbol.

Due to the usage of a FFT (Fast Fourier Transform) for OFDM, only fractions $½^n$, n=1, 2, . . . are possible. Since the number of samples and thereby the size of the FFT on the receiving side is reduced to that fraction, only every $2^n$-th subcarrier $m \cdot 2^n$, m=1, 2, . . . around the DC subcarrier m=0 can be resolved by the FFT at the base station and is therefore available for sounding, increasing the overhead accordingly by a factor $2^n$. Furthermore, the received signal energy is reduced to the same fraction $½^n$, degrading the quality of the channel estimation. This variant extends the range for coordinated sounding to distances equivalent to $1½^n$ symbol times, e.g. for n=1 and n=2 to a range of 15 km and 22.5 km, respectively, assuming a typical symbol time. FIG. 4*c* shows an example in which the detection window of the sounding symbol is reduced to ½ of the regular detection window accepting the drawback that only ½ of the available subcarriers with signal energy reduced by ½ can be used for sounding. The number of samples can be further reduced, e.g. to ¼. Thus, the number of simultaneously sounding mobile stations is reduced, resulting in additional overhead. This third variant allows current IEEE 802.16e/WiMAX conforming mobile stations to take part in coordinated sounding, but requires modifications at the base station side of the air interface. Allocating every $2^n$-th subcarrier can be achieved in a standard-conformant way by using so-called decimated sounding allocations.

The invention claimed is:

1. A method for radio channel estimation in a radio communication system, wherein the system comprises at least one mobile station and at least two base stations, each base station having a certain number of sectors and at least one antenna element for each sector, and wherein one of the base stations is a serving base station for the mobile station and the at least one further base station is a neighboring base station of the serving base station, the method comprising:
   generating a schedule for measurement signals in the serving base station;
   transmitting the schedule from the serving base station to the mobile station;
   transmitting in accordance with the schedule measurement signals from the mobile station to the serving base station;
   calculating a channel state for an uplink channel from the mobile station to the serving base station;
   determining an area around the sector in which the mobile station is located, wherein base stations within the area are neighboring base stations of the serving base station, wherein the at least one neighboring base station schedules measurements for mobile stations connected therewith and wherein at least one subcarrier is allocated to at most one of the mobile stations within the determined area, the at least one neighboring base station configured to distribute the subcarrier allocations within the determined area;
   transmitting the schedule from the serving base station also to the at least one neighboring base station;
   transmitting the measurement signals from the mobile station also to the at least one neighboring base station;
   calculating a mean channel state for the mobile station in the at least one neighboring base station;
   transmitting the mean channel state from the at least one neighboring base station to at least one further base station of the radio communication system; and
   distributing through the at least one neighboring base station transmit power that mobile stations connected therewith use for their measurement allocation to all other base stations within the determined area,
wherein the serving base station coordinates its measurement with the at least one neighboring base station within a certain range,
wherein all base stations within the range schedule measurement for their mobile stations during the same OFDM symbols and do not schedule any other transmissions during that time.

2. The method according to claim 1, wherein all neighboring base stations schedule measurements for mobile stations connected therewith and wherein at least one subcarrier is allocated to at most one of the mobile stations within the determined area.

3. The method according to claim 2, wherein each neighboring base station distributes to all other base stations within the determined area the subcarrier allocations intended for measurement of mobile stations connected therewith.

4. The method according to claim 2, wherein each neighboring base station distributes to all other base stations within the determined area the transmit power that mobile stations connected therewith use for their measurement allocation.

5. The method according to claim 1, wherein the transmitting of the measurement signals from the mobile station to the serving base station is repeated regularly.

6. The method according to claim 1, wherein the calculating of the mean channel state for the mobile station in the at least one neighboring base station is performed by averaging over multiple measurements in frequency and time.

7. The method according to claim 1, wherein each base station within the determined area distributes the calculated mean channel states to all other base station within the area.

8. The method according to claim 1, wherein the measurement signals comprise specific symbols and a prefix, wherein a delay of the measurement signals at neighboring base stations, which shall receive the measurement signals, is smaller than a length of the prefix.

9. The method according to claim 1, wherein the measurement signals comprise specific symbols and a prefix, wherein the specific symbols are extended according to an expected delay of the measurement signals at neighboring base stations, which shall receive the measurement signals.

10. The method according to claim 1, wherein the measurement signals comprise specific symbols and a prefix, wherein a sampling time for the measurement signals at neighboring base stations is decreased to a certain fraction of a regular sampling time.

11. The method according to claim 1, wherein the method is implemented as a computer program product for radio channel estimation in a radio communication system, the computer program product comprising a computer readable medium, having thereon computer program coding operative, when the program is loaded, to make a computer executable for carrying out the method.

12. A radio communication system, comprising at least one mobile station and at least two base stations, each base station having a certain number of sectors and at least one antenna element for each sector, wherein one of the base stations is a serving base station for the mobile station and the at least one further base station is a neighboring base station of the serving base station, and wherein:
the serving base station is configured to generate a schedule for measurement signals and to transmit the schedule to the mobile station;
the mobile station is configured to transmit measurement signals in accordance with the schedule to the serving base station; and
the serving base station is configured to calculate channel state for the uplink channel from the mobile station to the serving base station,
wherein:
the serving base station is further configured to determine an area around the sector in which the mobile station is located,
the at least one base station within the area is a serving base station,
the at least one neighboring base station schedules measurements for mobile stations connected therewith, and
the serving base station is further configured to allocate at least one subcarrier to at most one of said mobile stations within the determined area, wherein each of the at least one neighboring base stations is configured to distribute the subcarrier allocations to all other base stations within the determined area,
wherein:
the serving base station is further configured to transmit the schedule also to the at least one neighboring base station,
the mobile station is further configured to transmit the measurement signals also to the at least one neighboring base station, and
the at least one neighboring base station is configured to calculate a mean channel state for the mobile station and to transmit the mean channel state to at least one further base station of the radio communication system; and
the at least one neighboring base station is configured to distribute transmit power that mobile stations connected therewith use for their measurement allocation to all other base stations within the determined area,
wherein the serving base station coordinates its measurement with the at least one neighboring base station within a certain range,
wherein all base stations within the range schedule measurement for their mobile stations during the same OFDM symbols and do not schedule any other transmissions during that time.

13. A serving base station of a radio communication system comprising a receiver, a transmitter and an antenna system, wherein the serving base station is configured to:
generate a schedule for measurement signals and to transmit the schedule to a mobile station;
receive measurement signals from the mobile station transmitted in accordance with the schedule;
calculate a channel state for an uplink channel from the mobile station to the serving base station; and
determine an area around a sector in which the mobile station is located, wherein base stations within the area are neighboring base stations of the serving base station; and
wherein the serving base station is further configured to:
transmit the schedule also to at least one neighboring base station, and
receive a mean channel state calculated for an uplink channel from the mobile station to at least one neighboring base station in the at least one neighboring base station,
wherein the serving base station coordinates its measurement with the at least one neighboring base station within a certain range, wherein all base stations within the range schedule measurement for their mobile stations during the same OFDM symbols and do not schedule any other transmissions during that time.

14. A neighboring base station of a radio communication system comprising a receiver, a transmitter and an antenna system, wherein the neighboring base station is configured to:
- receive a schedule for measurement signals generated from a serving base station;
- receive measurement signals from a mobile station;
- calculate a mean channel state for the mobile station; and
- transmit the mean channel state to at least one further base station of the radio communication system;
- schedule measurements for mobile stations connected therewith;
- distribute transmit power that mobile stations connected therewith use for their measurement allocation to all other base stations within a predetermined area intended for measurement of mobile stations connected therewith; and
- distribute the subcarrier allocations to all other base stations within the determined area if at least one subcarrier is allocated to at most one of said mobile stations within the determined area,
- wherein all base stations within a certain range schedule measurement for their mobile stations during the same OFDM symbols and do not schedule any other transmissions during that time.

15. A mobile station of a radio communication system comprising a receiver, a transmitter and an antenna system, wherein the mobile station is configured to:
- receive a schedule for measurement signals from a serving base station wherein the received schedule indicates that the serving base station has coordinated its measurement with at least one neighboring base station within a certain range; and
- transmit measurement signals in accordance with the schedule to the serving base station;
  - wherein the mobile station is further configured to transmit the measurement signals also to the at least one neighboring base station, and wherein all base stations within the range schedule measurement for their mobile stations during the same OFDM symbols and do not schedule any other transmissions during that time.

* * * * *